INVENTORS
J. P. ECKERT, JR.
J. C. SIMS, JR.
H. F. WELSH
BY Charles C. English
AGENT INVENTORS
J. P. ECKERT, JR.
H. C. SIMS, JR.
H. F. WELSH
BY
Charles G. Englisch
AGENT INVENTORS
J. P. ECKERT, JR.
J. C. SIMS, JR.
H. F. WELSH
BY
Charles C. English
AGENT

PHASE MODULATED PULSE RECORDING SYSTEMS

Filed July 30, 1956

INVENTORS
J. P. ECKERT, JR.
J. C. SIMS, JR.
BY H. F. WELSH
Charles C. English
AGENT United States Patent Office 2,972,128
Patented Feb. 14, 1961

2,972,128

PHASE MODULATED PULSE RECORDING SYSTEMS

John Presper Eckert, Jr., Gladwyne, John Clark Sims, Jr., Springhouse, and Herbert Frazer Welsh, Philadelphia, Pa., assignors to Sperry Rand Corporation, New York, N.Y., a corporation of Delaware Filed July 30, 1956, Ser. No. 600,752

15 Claims. (Cl. 340—172.5)

The present invention relates to improved systems for recording pulse type information, such as may be required for instance in computer applications; and is more particularly concerned with the recording and reproduction of information in a more efficient manner than has been the case heretofore.

Various techniques have been suggested in the past for recording and reproducing pulse type information. Typical such techniques comprise the recording of pulses as a plurality of distinct signals, each of which has a leading and trailing edge. The recording of the binary information, for instance "1's," may thus be signified by presence of a pulse, while "0's" may be signified by absence of a pulse, such systems being ordinarily designated "return-to-zero" systems. A further method, suggested heretofore, comprises pulse envelope or non-return-to-zero techniques, wherein a positive-going transition, for instance, is used to identify a succeeding time space which would contain, for instance, all binary "1's"; and a subsequent negative going transition is used to identify a further time space which contains all binary "0's." Such non-return-to-zero or pulse envelop recording techniques ordinarily utilize a clock signal or sprocket in association with the recorded pulse envelope, thereby to uniquely determine the number of binary "1's" or "0's," present in the aforementioned time spaces. Still another technique suggested heretofore comprises the recording of binary "1's," for instance, by pulses of a first polarity and the recording of binary "0's" by pulses of an opposite-going polarity.

The several systems thus described exhibit various relative advantages and disadvantages in comparison with one another. In general, however, each of these systems is amplitude-sensitive; and as a result of this particular characteristic, threshholds must ordinarily be established in playback circuits so that noise appearing on the baseline of the recorded information will not trigger the said playback circuit during a clock or sprocket probing period, thereby to cause errors. A further characteristic of these known systems, particularly when they are employed for the recording of binary 1's and 0's, is that the recorded information ordinarily comprises an arbitrary train of pulses corresponding respectively to the said binary 1's and 0's, and this arbitrary train is ordinarily unsymmetrical with respect to the zero axis of the recorded information. By reason of this further characteristic, therefore, the duty cycle of circuits associated with the systems discussed previously, ordinarily varies so that the baseline itself is difficult to determine from the played-back or read-out signal. These systems are further accompanied by operational difficulties arising primarily by reason of mechanical skew which may be inherent during the recording and reproduction of information, and such skew difficulties further require that the density of recorded pulses be substantially less than the optimum density characteristic of the recording medium.

In order to obviate the foregoing difficulties, the present invention contemplates the provision of a pulse recording and reproduction system which utilizes a phase modulated technique for distinguishing between pulses respectively representative of binary 1's and 0's, and in accordance with a particular feature of the invention, an improved arrangement is provided whereby the recorded information itself may be utilized to generate an internal sprocket thereby to provide desired sampling of recorded information during read-out thereof.

It is accordingly an object of the present invention to provide an improved information recording and reproduction system.

Another object of the present invention resides in the provision of a recording system exhibiting better operational characteristics and capable of more efficient utilization of recording medium than has been the case heretofore.

A further object of the present invention resides in the provision of an improved recording and reproducing system utilizing a phase modulation technique to distinguish between recorded information of differing significances.

A still further object of the present invention resides in the provision of an improved apparatus for time sampling received phase modulated information; and in particular, resides in the provision of an improved arrangement adapted to afford a train of sprocket sampling pulses for effecting such sampling.

Still another object of the present invention resides in the provision of improved control circuits adapted to respond to pulse type recorded information for producing a self-generated sprocket from such recorded information.

Another object of the present invention resides in the provision of a novel recording and reproducing system having an improved signal-to-noise ratio; and in particular, resides in the provision of a system which, for all practical purposes, can ignore record noise.

Another object of the present invention resides in the provision of a recording and reproducing system capable of higher pulse densities in the recording of information, and capable in particular of considerably extending the upper limit of practical resolution which may be obtained from any recording material utilized.

A still further object of the present invention resides in the provision of a self-sprocketing recording and reproducing system which system exhibits substantially better operating characteristics than other recording or reproducing systems suggested heretofore.

In providing for the foregoing objects and advantages, the present invention contemplates the provision of an information reproducing system utilizing a phase modulation technique for distinguishing between received information of differing significances. In particular, binary 1's may be considered to comprise pulses of a first-going polarity occurring during spaced time intervals, while binary 0's may be considered to comprise pulses of an opposite-going polarity, i.e. 180 degrees out of phase with the said binary 1 pulses, occurring during the said spaced time intervals. Trains of such phase modulated pulses, representative respectively of binary 1's and 0's, may be recorded, for instance, in a magnetic tape having one or more channels; and the recorded information may in fact take the form of spaced blocks of information each of which blocks is divided into words or subdivisions of information. As will be discussed subsequently, when such a spaced block configuration is employed for the recording of information, non-information spaces comprising interblock portions of the recording medium may be utilized to store control signals comprising, for instance, sentinel pulses designating the beginning and ending of information blocks, as well as spaced synchronization pulses.

An overall information system cooperating with phase recorded information and control signals of the type discussed, may further include means responsive to signals on the tape for generating a sprocket pulse from that information, and this sprocket pulse may in turn be employed for sampling the recorded information during spaced substantially regularly occurring time intervals thereby to effect read-out of the stored information. By such an arrangement, therefore, the recorded information itself ultimately provides the desired sampling or sprocket pulses, thereby improving considerably the reliability of operation in the system.

In accordance with further features of the invention, information which has been read-out by the foregoing technique, may be coupled to register devices adapted to store information during different time periods whereby a desired translation between a relatively slow speed tape and a relatively high speed computer, for instance, may be effected in a most efficient manner.

The foregoing objects, advantages, construction and operation of the present invention will become more readily apparent from the following description and accompanying drawings, in which:

Figure 1 (A through I inclusive) comprises waveforms illustrating the operation of an improved recording and reproducing system in accordance with the present invention.

Figure 1:
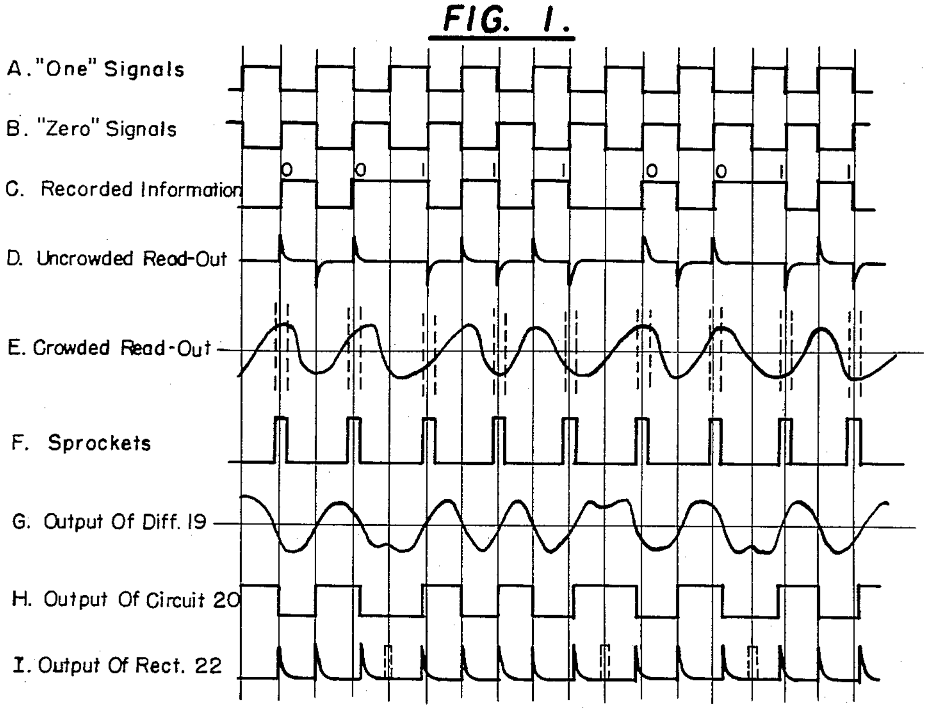

Referring now to Figure 1, it will be seen that, in accordance with the present invention, information pulses representative of either binary 1's or binary 0's may take the form of pulse type signals having characteristic phases. Figure 1A may be considered to represent a train of binary 1's and it will be seen that each such binary 1 is signified by a square wave or a sine wave having a first phase. Figure 1B may be considered to represent a train of binary 0's, and again it will be seen that each such binary 0 comprises a square wave or sine wave generally of the configuration corresponding to the aforementioned binary 1's, but 180 degrees out of phase with such binary 1's.

Such a phase modulation notation, of course, provides unique definitions for the presence or absence of a binary 1 or a binary 0, in that a particular digit represented is determined by the phase of the signal that is recorded. The actual recorded determination can be made on playback either by comparison of the recorded signal with some standard, or by phase comparison of the said recorded signal with a generated sprocket pulse. The generated sprocket in turn comprises a train of spaced regularly occurring pulses (see for instance Figure 1F), and the phase of such a sprocket pulse train may be established by a memory circuit, for instance. In accordance with a particular feature of the invention such as will be described, the aforementioned sprocket or sampling pulses are internally generated during the read-out of information whereby the actual phase of such sprocket pulses relates directly to the occurrence time of recorded information.

A train of information may, of course, comprise both binary 1's and binary 0's in accordance with the previously discussed phase definitions thereof; and one such illustrative information train has been shown in Figure 1C. The actual information which is recorded in the pulse train comprising Figure 1C is designated adjacent the waveform of Figure 1C; and it will be noted that, as has been discussed, the recorded or received information takes the form of an arbitrary train of mixed phase pulses wherein the actual recorded or received phases of these pulses determine the information which has been recorded.

In the read-out or playback of information recorded by a phase modulation technique such as has been illustrated in Figures 1A through 1C, or by one of the other recording techniques discussed heretofore, the playback devices ordinarily utilized generally have a restricted bandwidth for both stability and noise reasons. For this reason, the reproduced information is not precisely in the form in which it was recorded. For example, it is usually desirable to limit the lower end of the frequency spectrum which can be reproduced so that D.C. components will not be accumulated, inasmuch as such an accumulation of D.C. components could in fact radically shift the baseline of reproduced information thereby causing errors during the read-out of such information. To avoid such errors, magnetic reproducing systems generally have a definite and well-defined low frequency cut-off; and in fact optical recording and reproducing systems also have similar frequency-responsive characteristics. In addition, playback systems of the types generally employed for the reproduction of pulse type information, ordinarily restrict the upper end of the frequency spectrum so that noise signals cannot pass to detecting and analyzing circuits coupled to the playback apparatus.

By reason of the foregoing usual characteristics in playback devices, such as conventional magnetic transducers, read-out or reproduced information generally takes the form of the derivative of the recorded or received signal; and in the case of a phase modulated recording of the type illustrated, for instance in Figure 1C, the playback information will take the form of a positive and negative potential swing symmetrically disposed about some center line, with the order of occurrence of the said positive and negative swings being determined by whether the recorded information took the form of a positive-going or negative-going signal transition. Thus, referring to Figure 1D, it will be seen that read-out information corresponding to the recorded information illustrated in Figure 1C, comprises a series of positive-going and negative-going spaced pulse transitions, as illustrated.

The particular waveform of Figure 1D is in fact highly idealized and such signals will only be observed if the recording medium, such as a magnetic tape, is operated well below its limit of resolution. As the recorded pulses are crowded closer and closer together on the recording medium, however, certain changes in the read-out or playback characteristics of those pulses will be observed in practice. In particular, after some limiting value of resolution has been reached, recording can still be effectively done at higher pulse densities but the observed played-back signals are considerably reduced in amplitude. This reduction in amplitude cannot, of course, be cured merely by using a higher gain playback amplifier, since all of the original sources of noise in the system still exist; and further, the random characteristics of the recording medium itself remain and produce noise. In addition, cross-talk, not only between reproducing units but between different interacting circuit elements, becomes more objectionable and the threshold for clipping out the aforementioned noise becomes more critical. As a result of these objectionable features, the amplitude-sensitive recording arrangements discussed previously become less and less reliable as the density of recording is increased; and this unreliability is enhanced by wandering of the reproduced baseline due to uncancelled D.C.

components which serve to destroy the effectiveness of threshold systems employed whereby noise pulses may create further error during reproduction of information.

The idealized waveform for uncrowded signals, illustrated and discussed in reference to Figure 1D, actually degenerates for highly crowded signals into a waveform generally of the type shown in Figure 1E; but it should be noted that in the phase modulation techniques comprising a preferred form of the present invention, the disadvantages which are inherent in the amplitude-sensitive systems discussed previously, do not apply. In particular, referring to Figure 1E, it should be observed that positive read-out excursions are always followed at once by negative read-out excursions; and the areas above and below the nominal baseline illustrated tend to rebalance, at least within a finite number of read-out pulses. Accordingly, no D.C. restorers are required during read-out of phase modulated information, in accordance with the present invention, provided the time constants of the various read-out circuit elements are properly designed, with the characteristics of Figure 1E in mind.

In addition, it should be noted that due to the alternately occurring positive and negative-going characteristics of the read-out signal in Figure 1E, it is possible to generate a sprocketing signal or sampling pulse directly from the read-out information; and this possibility of a self-generated sprocket should be distinguished from the amplitude-sensitive systems discussed previously wherein an independent external sprocket source is provided, if such a source is to be utilized at all, whereby any time misalignment between the said external clock or sprocket source and the recorded information can, and in fact frequently does, provide errors during playback or read-out of the said information.

Sprocket pulses generally of the type shown in Figure 1F cannot, of course, be directly generated by the read-out signals shown in Figure 1E; and therefore, as will be discussed, control circuits are provided which are responsive to the readout information (Figure 1E) for providing the desired sprockets (Figure 1F). In particular, these control circuits, such as will be discussed in detail with reference to Figure 2, comprise means initially differentiating the read-out signal thereby to provide a differential waveform such as is shown in Figure 1G; and the resulting differentiated signal is fed to a conventional amplifier and pulse shaper circuit thereby to provide a shaped squared and timed pulse train of the type shown in Figure 1H. The signal of Figure 1H may thereafter be again differentiated, and full wave rectified, to provide a series of pulses (Figure 1I) corresponding approximately to the transition points of the original recorded information (Figure 1C).

As will be apparent by examination of the several waveforms shown in Figure 1, some of the timing pulses in the train of Figure 1I are missing; and these missing pulses have in fact been illustrated in dotted outline. Also, as may be seen from Figure 1I, some of the timing pulses will be displaced in time from optimum positions due to pulse crowding on the recording medium and due further to noise in the system, inasmuch as such superimposed noise can cause the distorted wave shape to apparently peak early or late. These deviations from the ideal timing points in the signal of Figure 1I can be corrected through the use of a flywheel oscillator, and such oscillators are well known in the art, particularly in television applications, with one such oscillator being illustrated, for instance, in the prior copending application of H. Frazer Welsh, Serial No. 569,069, filed March 2, 1956, for "Pulse Group Synchronizers."

When such a flywheel oscillator is employed, the said oscillator may receive frequency and phase lock from a signal train generally of the type shown in Figure 1I (i.e. the oscillator is synchronized, ultimately, by the recorded information to be reproduced), but due to the relatively high Q of the oscillator circuit, the said oscillator is incapable of changing its frequency rapidly, and will therefore operate to emit pulses at the average rather than at the instantaneous timing points of the received synchronizing signal. Such a flywheel oscillator therefore may be employed to retime the aforementioned sprocket pulses so that substantially regularly occurring pulses, similar to those shown in Figure 1F, will occur.

It will be appreciated, however, that the timing pulses shown in Figure 1I actually occur at twice the desired sampling frequency (Figure 1F), inasmuch as there are two pulses for every information pulse phase time of the recording system. Accordingly, as will be further described, the output of the aforementioned flywheel oscillator is passed to a binary counter which gives out one pulse for every two fed thereto; and, inasmuch as such a binary counter can arbitrarily lock-in on either the odd or even strings of pulses, means are further provided for properly locking the said binary counter to provide a proper output pulse sequence. The resultant output of such a binary counter, which has been illustrated in Figure 1F and which may be considered to comprise the desired internally generated sprockets, provides a plurality of sampling pulses occuring at or near the peak excursions of the read-out signal, shown in Figure 1E; and such sprockets in fact occur near the positive peak for signals representing binary 0's and near the negative peak for signals representing binary 1's.

An overall system employing such an internally generated sprocket is in fact considerably less sensitive to noise than any of the amplitude-sensitive systems described previously; and this follows when it is considered that the sampled output wave (Figure 1E) need be periodically analyzed merely to determine whether it is positive or negative in potential, thereby to provide a read-out determination corresponding to a binary 0 or to a binary 1. Moreover, the width of the sampling pulse (Figure 1F) can be made arbitrarily narrow whereby the sampling can be done in a time which is short compared to the time constants of the playback system; and if the sampling is in fact accomplished at a frequency above the bandpass of the playback system, then noise becomes ineffective during the sampling period; and indeed, the effect of noise will be not to change the amplitude of the received signal but rather to shift its peak slightly with respect to the ideal sampling time. Inasmuch as these small changes in occurrence of the read-out signal peak in effect merely change very slightly the amplitude of the sampled signal but do not change the polarity of that sampled signal, errors in playback become highly unlikely; and the overall result of such operation is that pulses may be recorded with substantially higher densities and considerably above the nominal resolution limit of the recording material employed, without appreciably increasing the probability of read-out errors.

Before proceeding with a detailed description of a recording and reproducing system operating generally in the manner already described, it should be noted that the recording of information may, as has been discussed, take the form of blocks of information of some convenient finite length with each of these blocks being divided into words or subdivisions of information. For instance, by way of example, each recorded word may comprise twelve binary digits and each such block of information may comprise 60 words or 720 total digits. A succession of such blocks may be recorded on a magnetic tape or wire in a single channel, and plural such blocks may in fact be recorded in plural channels on the recording medium. A space is ordinarily provided between each block of information on the recording medium, inasmuch as it is usually desirable to start and stop the recording medium or magnetic tape between information blocks whereby an acceleration-deceleration space should be provided. Naturally, the length of the space actually provided between information blocks will be determined primarily by the characteristics of the mechanical tape handling system; but, inasmuch as such an interblock space is in general preferable, this interblock space can be employed for providing control information.

In particular, and referring to the preceding discussion, it should be noted that when a flywheel oscillator is employed to generate the desired sprocket or sampling pulses in a phase modulated system of the type discussed, the said oscillator is ordinarily required to lock into the same frequency as that of the recorded signal. A flywheel oscillator, however, due to this Q, requires some minimum number of synchronizing pulses in order to establish the frequency and phase lock thereof; and such synchronizing pulses can in fact be disposed in the aforementioned space between information blocks. In addition, as has been discussed, a binary counter is utilized in accordance with the present invention for halving the output pulses of the said flywheel oscillator, and such a binary counter must be preset to sample at the correct phase time of the sampling system. The control pulses disposed between recorded information blocks can therefore be further employed to assure that the said binary counter is in correct step with the incoming signal prior to actual sampling of that signal. The interblock space can also be employed to contain sentinel pulses representing the beginnings and ends of information blocks, and the overall system can be further designed to perform characteristic functions in response to occurrence of such sentinel pulses, thereby further minimizing possible errors during read-out.

Figure 2:
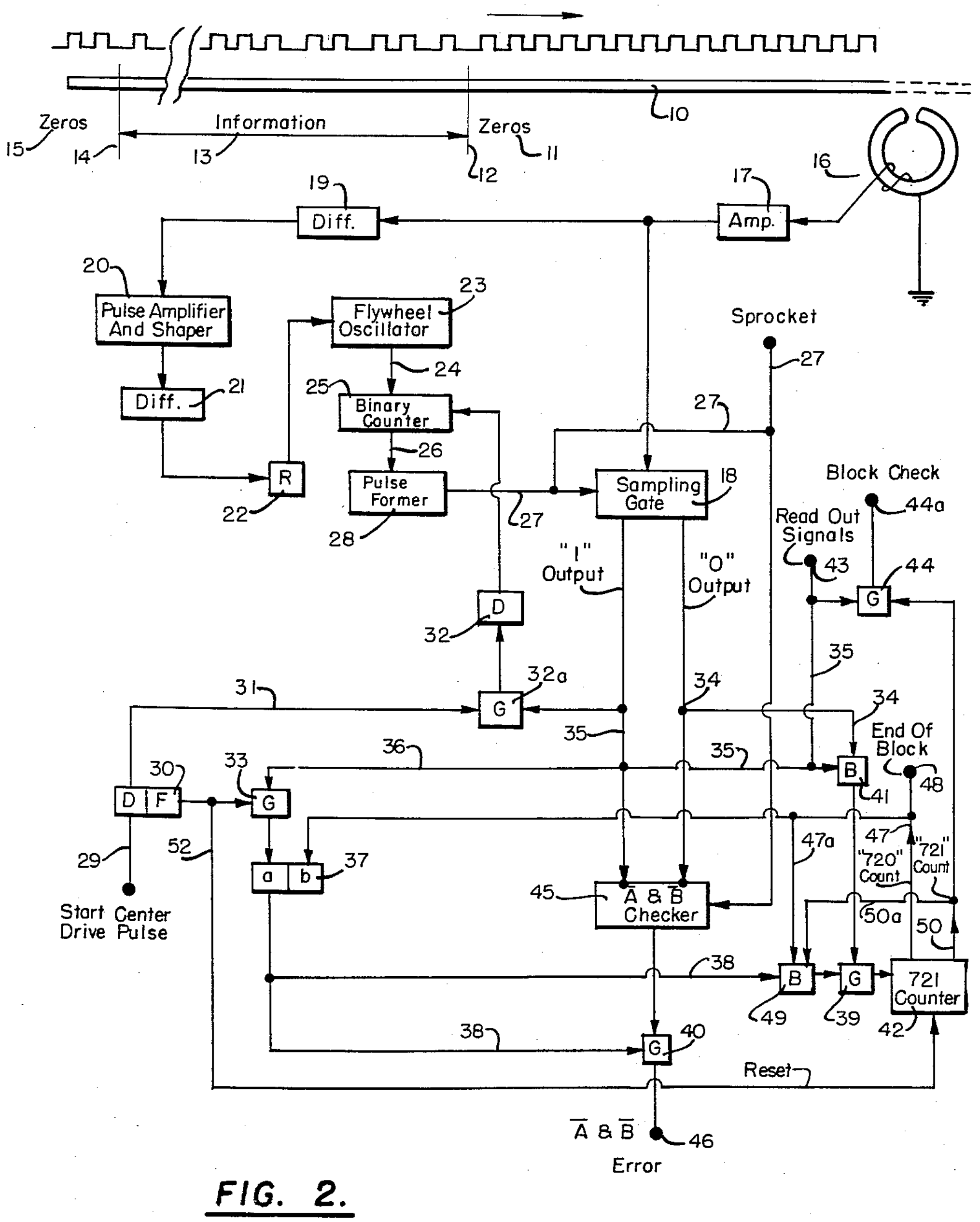
Figure 2 is a block diagram illustrating a control arrangement adapted to effect the self-generated sprockets and information read-out which are characteristic of the present invention.

A typical arrangement, generally of the type thus far described, is illustrated in Figure 2; and in particular, it will be seen that a magnetic tape 10 may be disposed adjacent a reproducing transducer 16 for the playback of signals recorded on the said tape 10. The recorded signals may in turn take the form of a first group of control pulses comprising a train of binary 0's 11 (Figure 1B), immediately followed by a sentinel digit 12, taking the form of a binary 1. The signals 11 and 12 are, of course, disposed in the aforementioned interblock space, and sentinel digit 12 is followed on tape 10 by a sequential string of information bits 13 (similar for example to Figure 1C), terminating in a further sentinel digit 14, again comprising a binary 1 (Figure 1A). Further control pulses or binary 0's 15 extend thereafter into the next space between blocks of information.

Signals so recorded on tape 10 are sensed by the said reproducing head or transducer 16, and such sensed signals, which are generally of the form shown in Figure 1E, may be amplified in an amplifier 17 whereafter they may be coupled to a sampling gate 18 and to a differentiator 19. The output of differentiator 19 corresponds generally to the waveforms shown in Figure 1G, and this output may in turn be coupled to a pulse amplifier and shaper circuit 20 whereby a squared output of the type shown in Figure 1H is produced. The output of circuit 20 is thereafter differentiated by a differentiator 21 and this further differentiated output is rectified by a full wave rectifier 22 whereby a series of unidirectional pulses, generally of the type shown in Figure 1I, appear at the output of the said rectifier 22. The timing pulses so produced at the output of rectifier 22 are coupled to the input of a flywheel oscillator 23 and serve to establish a time and phase lock for the alternating output of the said oscillator 23 whereby the said oscillator 23 emits regularly occurring spaced pulses, on a line 24, to a binary counter 25.

It will be appreciated that the signals appearing on line 24 are at twice the frequency of the desired sampling or sprocket pulses whereby the binary counter 25 serves to produce one output pulse for each two input pulses thereto; and such binary counter pulses may be coupled via a line 26 and pulse former 28 thereby to effect reshaped regularly occurring sprocket pulses (Figure 1F) on the line 27. The signals appearing on line 27, of course, comprise the internally generated sprockets discussed previously, and such sprocket pulses may in turn be utilized to effect a desired sampling of information sensed by transducer 16 and amplified by amplifier 17. In particular, the sprocket pulses appearing on line 27 are coupled to the aforementioned sampling gate 18 together with the amplified pulses appearing at the output of amplifier 17.

Figure 3:
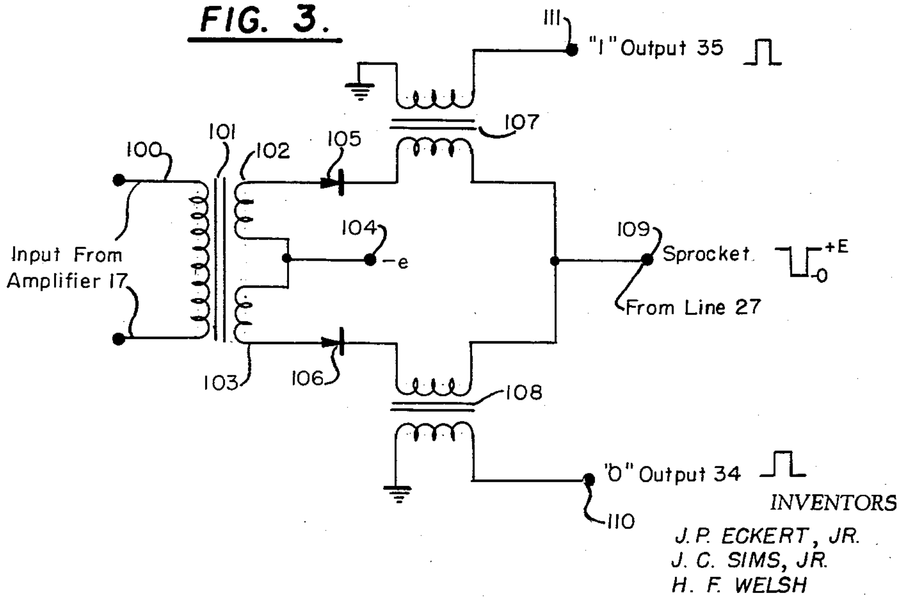
Figure 3 is a schematic diagram of an improved sampling gate such as may be employed in accordance with the present invention.

The sampling gate 18 may take the form illustrated in Figure 3, and therefore reference is made to the said Figure 3 before proceeding with the remainder of Figure 2. In particular, signals to be detected or sampled and appearing at the output of amplifier 17, may be fed to the primary winding 100 of a transformer 101; and the said transformer includes secondary windings 102 and 103 interconnected as shown. A threshold bias is established by applying a slightly negative voltage $-e$ to a terminal 104, and the overall circuit operates through diodes or rectifiers 105 and 106 to pass respective negative and positive peaks which exceed the threshold bias at terminal 104, through further transformers 107 and 108. Sprocket signals appearing on line 27 (Figure 2) are fed to the sampling gate circuit at a terminal 109, and positive inputs to the transformer winding 100 (i.e. the lower end of winding 100 is positive with respect to the upper end thereof), effect an output at terminal 110 (corresponding to the "0" output terminal 34, to be discussed) via diode 106 and transformer 108. Similarly, negative inputs from amplifier 17 to winding 100 (i.e. the upper end of winding 100 is positive with respect to the lower end thereof), effect outputs at terminal 111 (corresponding to "1" output terminal 35, to be discussed). These outputs appear at terminals 110 and 111, of course, only if the input signals at winding 100 are sufficiently large to exceed the threshold bias applied to terminal 104.

Returning now to the arrangement shown in Figure 2, let us assume that the overall reproducing system is initially at rest, with the transducer 16 being disposed somewhere along tape 10 between blocks of information. In response to a start signal coupled to the overall system, a drive motor may be caused to start movement of tape 10 past transducer 16, and such a start signal can also be fed to the overall read-in circuit, illustrated in Figure 2, along a line 29. Occurrence of such a start signal on line 29 operates a delay flop 30 (or one-shot multivibrator) thereby causing a temporary output signal to instantaneously appear on line 31, and the signal so impressed on line 31 enables a gate **32*a* so that any "1" outputs appearing on line 35 at the output of sampling gate 18 may be caused to pass via the said gate 32*a* and a delay element 32, to one input of the aforementioned binary counter 25. Delay flop 30 is selected to have a time constant of sufficient length so that the tape 10 will come up to full speed whereby synchronization of the flywheel oscillator 23 and binary counter 25 will be established during this operating period of the said delay flop 30**.

As has been discussed, a train of "0's" 11 is recorded in the interblock space, and accordingly, the signals initially sensed by transducer 16, as the said tape comes up to speed, are known to be representative of such binary 0's. When the flywheel oscillator 23 establishes synchronization with incoming signals, the output of the said flywheel oscillator commences stepping of the binary counter 25 at the proper rate; and, as has already been discussed, the counter can fall into either a correct or incorrect phase position relative to the sensing times for the overall system. If the said binary counter 25 should fall into an incorrect phase position, the pulses delivered via pulse former 28 to line 27 during the interblock space, will cause outputs from sampling gate 18 to appear on the "1" output line 35. Appearance of such "1" outputs therefore causes a pulse to be delivered via line 35, gate **32*a* and delay means 32, to the aforementioned input of binary counter 25; and such an input pulse to binary counter 25 is, of course, in addition to those appearing on line 24 from the output of flywheel oscillator 23, whereby the said binary counter 25 is caused to make one extra step. This extra step serves to move the binary counter into correct phase so that further outputs during the interblock space from the sampling gate 18 appear on the "0" output line 34, corresponding, of course, to the reading of the interblock "0's" 11. Thus, at the termination of the operation of the delay flop 30, both the flywheel oscillator 23 and the binary counter 25** will be in correct step and phase lock.

When delay flop 30 flips back, a signal is emitted along line 52 to a counter 42 (to be described) as well as to a gate 33. That signal on line 52 resets counter 42 to a zero count position whereby the said counter 42 is readied to count a number of pulses corresponding to the binary digital signals which are to comprise a single block of information. The signal from delay flop 30, which is coupled to gate 33, opens the said gate 33 whereby the next "1" output on line 35 from sampling gate 18 passes via line 36 and thence via the said opened gate 33 to a flip-flop 37, thereby putting the said flip-flop 37 in an *"a"* output producing position. It will be appreciated that such a "1" output appearing via sampling gate 18 will not be produced until the sentinel pulse 12 is detected by transducer 16; and therefore flip-flop 37 is set to its *"a"* output producing condition upon arrival of the said sentinel 12, signalling the beginning of a block of information 13. When flip-flop 37 shifts to its *"a"* output producing condition, it energizes lines 38 thereby to open gate 40 and, via buffer 49, to open gate 39. The opening of gate 39 allows pulses from buffer 41 to pass therethrough to the "721 pulse counter" 42; and it will be noted that the said buffer 41 in fact receives both "1" inputs and "0" inputs from the sampling gate 18 via lines 34 and 35. Thus, following the arrival of the sentinel 12, the arrival of either a "0" or a "1," as sensed by transducer 16 and as detected in the sampling gate 18, will step the counter 42.

The "1" outputs appearing on line 35 are also coupled to a terminal 43 which represents the signal output terminal of the reading system, and the said terminal 43 may in fact be coupled to further utilization circuits or registers comprising an overall system. Terminal 43 is also coupled to a further gate 44, the function of which will be described subsequently.

Lines 34 and 35, which represent possible outputs from sampling gate 18, are coupled to two inhibition terminals respectively of a gate 45; and a further input to the said gate 45 is received from sprocket line 27. Thus, in the absence of either "1" inputs or "0" inputs at the time a sprocket appears on line 27, an output passes from gate 45 to the gate 40; and inasmuch as the said gate 40 is enabled by the *"a"* output of flip-flop 37, a signal will, for this condition of operation, appear at terminal 46. Appearance of such a signal, which is in effect an error signal, at terminal 46 merely means that the read-in signal is so weak that neither the "1" output nor the "0" output lines 35 and 34 has been energized. In other words, nothing was received at a time when a signal, either positive or negative, should have been present.

Tape 10 now continues its traverse past transducer 16, whereby information pulses 13 may be sensed by the said transducer 16 and sampled pulses may thereafter be read-out at terminal 43. During such a read-out operation, and as has been mentioned previously, pulses are applied from lines 34 and 35 via buffer 41 and thence via gate 39 to the counter 42; and these pulses so applied to counter 42 cause it to step with the arrival of each "0" and "1" pulse in the information train 13. In effect, therefore, the counter 42 is caused to step for occurrence of each sprocket pulse appearing on line 27. After a total of 720 pulses have been received by counter 42 (these 720 pulses being arbitrarily selected to designate a block of information, as discussed previously), the counter 42 emits a pulse corresponding to the "720" count on line 47. This pulse on line 47 is coupled to a terminal 48 which signals external circuits that a block of information has been read; and the pulse on line 47 is further coupled to the *"b"* side of flip-flop 37 thereby to reset the said flip-flop 37.

When flip-flop 37 is so reset, gate 40 is closed; and in addition, the signal is removed from line 38, which signal had been coupled to the gate 39 via buffer 49. The signal on line 47, however, is also applied, via line **47*a*, to the buffer 49 and through the said buffer to the said gate 39 whereby the gate 39 remains open during the aforementioned "720" count. The next succeeding digit to be sensed by head 16 will emit either a "1" or a "0" to the buffer 41, and accordingly, another pulse will pass to the counter 42 via gate 39 to step the said counter 42 to a "721" count position. For this further stepping of the counter 42, the pulse on line 47 disappears and a signal appears on line 50** representing the aforementioned "721" count.

This latter signal is applied again to buffer 49 via a line **50*a* to hold gate 39 open during this 721st pulse (which, for proper operation, should represent the sentinel pulse indicating the end of the block of information 13). The "721" count pulse appearing on line 50 is also applied to gate 44; and inasmuch as the second input to the said gate 44 is received from read-out terminal 43 and ultimately from the "1" output line 35 of sampling gate 18, the said gate 44 will emit an output to terminal 44*a* during the 721st pulse count effected by counter 42 only if a "1" output appears on line 35 during this 721st pulse. Gate 44 therefore serves to provide a block check, and occurrence of an output at terminal 44*a* indicates that a correct number, i.e. 720 information pulses, have been sensed from the tape 10 followed by a 721st sentinel or "1" pulse 14**.

In practice, the block check signal appearing on terminal **44*a* could be applied to the tape drive mechanism as a stop signal to halt further motion of the tape across the transducer 16. Since such halting action cannot be instantaneous, due to the inertia of the drive mechanism, a number of the interblock "0" signals will be fed into the apparatus of Figure 2. The first such interblock "0" pulse 15 will pass, as before, via buffer 41 and gate 39 to the counter 42 whereby the said counter takes one further step thereby to remove the signal from line 50. At this point all inputs to buffer 49 are deenergized and the gate 39 closes thereby preventing further stepping of counter 42. Additional signals sensed by transducer 16 (which should be interblock "0's" 15, for instance), will accordingly be without effect until a new start signal is sent along line 29 to delay flop 30. Upon occurrence of such a further start signal on line 29, the original starting procedure already outlined takes place, whereby tape 10 commences moving, the flywheel oscillator and binary counter are correctly locked, and counter 42** is reset to a zero count position preparatory to reception of a further block of information.

To summarize the process thus described in reference to Figure 2, it should be noted that, in accordance with the present invention, a first group of non-information pulses is read from the recording space between information blocks, and these pulses are utilized to establish both phase and frequency lock of a flywheel oscillator. As a further step, these pulses are also used to establish proper operation of a binary counter whereby the binary counter then performs as a master clock or sprocket for the information channel to be read. Termination of the non-information signal or control portion of the recording, is indicated by a sentinel pulse taking the form of a reversed phase pulse, and this sentinel pulse serves to alert receiving circuits to subsequent information. The block of information is then read-in, sampled, and interpreted by the aforementioned clock or sprocket, and a counter is used to define the amount of information to be sensed in each block, whereafter termination of the information is indicated once more by repetition of the sentinel. This sentinel is, as has been described, required to coincide with a predetermined count of the counter, and in the absence of such coincidence, an error signal is provided, indicating that the read-out operation has somehow been incorrect. Pulses sensed after occurrence of the end-of-block are, as has been described, non-information pulses and the system provides for rejection of these pulses.

It should be mentioned in passing that the string of non-information or control pulses, such as 11 and 15, which are utilized to synchronize the oscillator 23 and binary counter 25, can also be used to establish the operation of automatic gain control circuits in amplifier 17. This is most desirable since it permits the gain of the read-in amplifier 17 to be standardized before the arrival of information signals, such as the block 13; and accordingly, the provision of such an AGC feature comprises a further refinement in accordance with the present invention.

The foregoing description, of course, has been concerned with the reading of signals from a single channel in the record material 10. The repetition rate of signals emitted by the read-in circuit is determined by the pulse density of information on the tape 10 as well as by the tape velocity, and variations in tape speed will, of course, alter the repetition rate of the incoming signals as sensed by transducer 16. Most computing or control circuits have their own optimum repetition rates which are probably different from that delivered by tape 10, and in most cases the electronic circuits or utilization devices responding to signals appearing, for instance, at terminal 43, will operate at a much higher repetition rate than the tape signals. Thus, it is necessary to provide an input synchronized to effectively transfer information from the relatively low speed tape 10 to the relatively high speed utilization device, such as a computing system, which may be coupled ultimately to read-out terminal 43.

In a single channel recording system, such as has thus far been described, it is sufficient to provide a one-bit register, such as a flip-flop, which can be loaded by an input circuit such as terminal 43, and unloaded by the computing circuit. When multichannel systems are employed, however, it is necessary not only to make the aforementioned transition from the slow speed tape system to the high speed computing systems, but in addition it is necessary to make this transfer in coherent groups of related pulses from the cooperating channels on the tape. A more complicated register system is thus ordinarily required; and in accordance with a particular feature of the present invention two registers, for instance of the shifting register type, can be employed in association with each channel on tape 10 for the selective storage of information pulses. Switching means can also be provided to permit incoming information from the tape 10 to be routed alternately to first one and then the other of the said two registers associated with a given information channel; and further switching can also be provided to alternately route information from the registers to an external circuit such as a computer. These switching means for loading sensed information into a register and for thereafter unloading stored information from the registers to the computing circuit, are illustrated respectively in Figures 4 and 5; and it will be appreciated that the arrangements of Figures 4 and 5 represent register and switching systems which can be coupled, for instance to the terminal 43 of Figure 2, with such systems being typical for a single information channel on the tape 10.

Figures 4, 6:
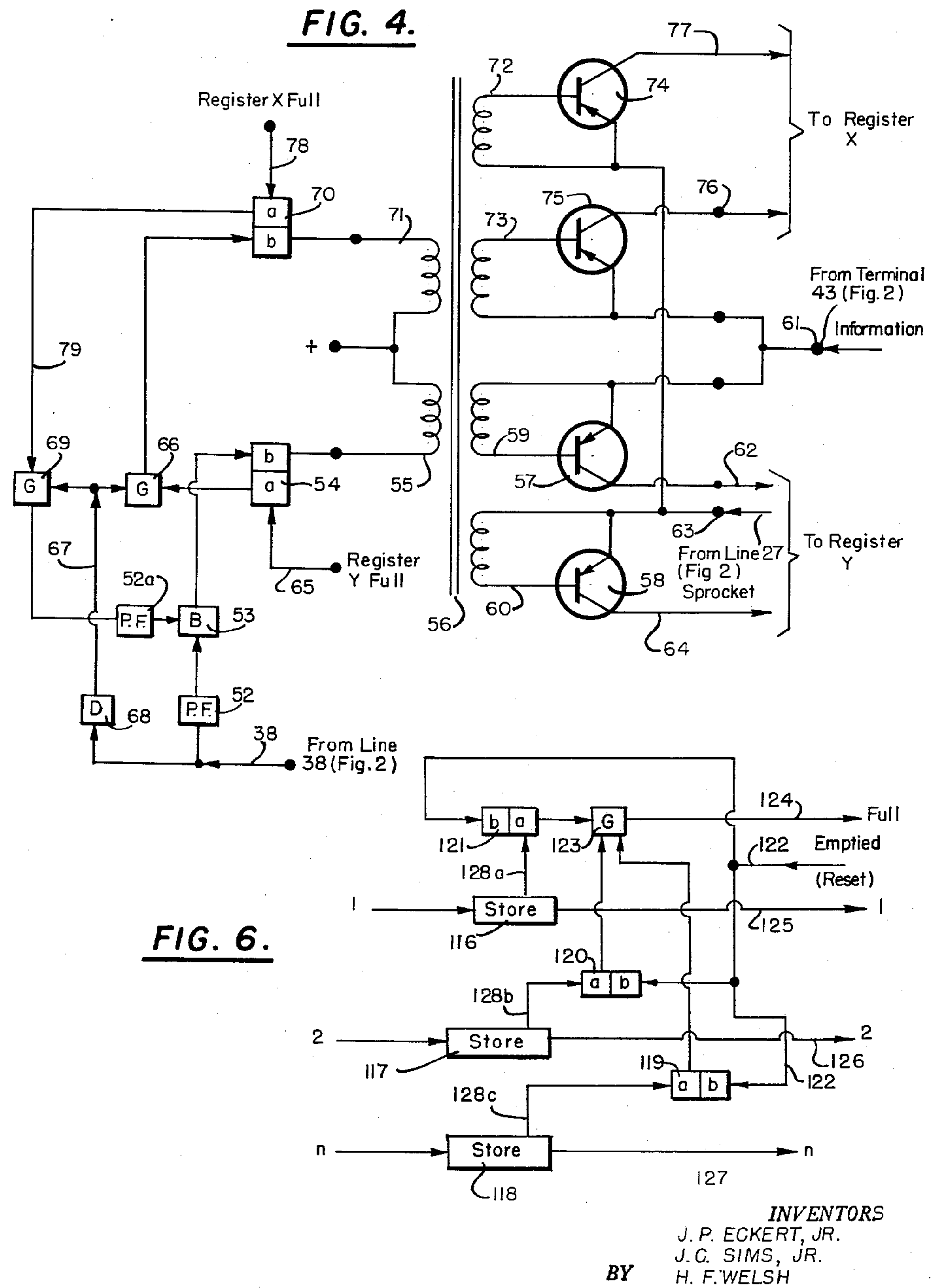
Figure 4 is a diagram illustrating a register read-in arrangement, such as may be employed in combination with the arrangement of Figure 2.
Figure 6 illustrates an improved register system which may be employed in conjunction with a plural channel recording system generally of the type illustrated in Figure 2.

Referring now to Figure 4, let us initially assume that two registers are supplied for a given information channel on tape 10; and let us designate these registers as "Register X" and as "Register Y." In operation, information sensed from tape 10 can be coupled initially to one of the said registers, for instance register Y, and after one word of information, for example twelve digits, has been read-in, the Y register can be considered to be full. The filling of the said Y register could, in such an event, be sensed, as one example by a sentinel pulse, or by appropriate counters connected to the shift line of the registers. If a sentinel is used, this sentinel pulse might in fact be initially placed in the first stage of the register so that after the register has made twelve shifts (corresponding to one word of information), the said stored sentinel will appear in the last stage of the register thereby indicating that register Y, for instance, is full. Arrival of such a sentinel pulse in the last stage of register Y could thereafter cause the next word of information to be routed to the other register associated with the given channel of information, namely, the X register; and the sentinel in register Y could simultaneously connect the output circuit to the Y register so that during the time that the X register is being filled the Y register can be emptied. A converse situation, of course, occurs after the X register is filled, whereby the overall circuit alternately fills one register while the other is being emptied and then reverses to fill the other said register while the first is being emptied.

In particular, referring to Figure 4, it will be seen that a switch element can be employed for connecting both shifting sprocket pulses and information pulses to the aforementioned X and Y registers alternately. In accordance with a preferred embodiment of the invention, transistor contact switches are employed for accomplishing this purpose. As illustrated in Figure 4, the aforementioned register operation may be commenced by appearance of a pulse on line 38, and this line 38, of course, corresponds to the lines 38 already described in reference to Figure 2. Occurrence of a pulse on line 38 indicates that the aforementioned flip-flop 37 (Figure 2) has been set to its "*a*" output producing condition in response to a sentinel pulse from tape 10 whereby the system is in condition to receive and sense a block of information, such as 13. The leading edge of the pulse on line 38 (Figure 4) is shaped by a pulse former 52, and thereafter the said pulse on line 38 passes to a buffer 53 and thence to the "*b*" input side of a flip-flop 54, thereby to set flip-flop 54 to its "*b*" output producing condition.

When flip-flop 54 is so set, winding 55 of a transformer 56 becomes energized whereby transistors 57 and 58 are rendered conductive by potentials on windings 59 and 60 of the said transformer 56. Conduction of transistor 57 allows information to flow from terminal 43 (Figure 2), via terminal 61 (Figure 4) and thence via the said transistor 57 to line 62 which represents an input line to the aforementioned register Y. In a similar manner conduction of transistor 58 allows sprocket signals from line 27 (Figure 2) to pass via terminal 63 through the said transistor 58 and thence to line 64, whereby the said sprocket signals on line 64 serve to step the shifting register Y, upon receipt of each information pulse on line 62.

Information will therefore flow to register Y, and this information will be stepped from stage to stage in the said register until register Y is full. Filling of the register can be signified, as has been discussed, by arrival of a sentinel in a preselected or last storage space in the register, and this state of operation will in turn cause a signal to be returned to flip-flop 54 over line 65. Flip-flop 54 will then return to its "*a*" output producing state thus de-energizing transformer winding 55, and resetting of the said flip-flop 54 to its "*a*" output state will also couple a signal to gate 66 thereby to enable the said gate 66.

In passing, it should be noted that during the period before receipt of a start signal on line 38, gate 66 was similarly enabled by the "*a*" output of flip-flop 54. For this initial state of operation, however, no second input was applied to the said gate 66 along line 67, inasmuch as a delay element 68 is interposed between the second input terminal of gate 66 and the output of pulse former 52. Thus, when the initial start signal appears on line 38, this start signal is, as has been described, applied to the "*b*" input side of flip-flop 54 via buffer 53, and is also applied to the second input terminal of gate 66 via delay means 68. Delay means 68, however, is so selected that a sufficient time delay is imposed to allow flip-flop 54 to move to its "*b*" position before initial application of a signal on line 38 effects a pulse on line 67. When the flip-flop 54 is returned to its "*a*" position upon receipt of a signal on line 65, however, the gate 66 is caused to pass an input signal to the "*b*" side of a further flip-flop 70 (since a signal is still being applied to line 38) thereby setting the said flip-flop 70 to its "*b*" output producing condition and energizing winding 71 of transformer 56. For this latter state of operation, therefore, arrival of a signal on line 65, indicating that register Y is full, ultimately switches the register circuit to its second mode of operation whereby transistors 74 and 75 are rendered conductive in response to potentials appearing on windings 72 and 73; and information pulses at terminal 61 as well as sprocket pulses at terminal 63 now flow to register X along line 76 and along line 77 respectively, thereby to cause the said register X to store and step information.

During the time that information and sprocket pulses are being so coupled to register X, the output circuit of the synchronizer (to be described in reference to Figure 5) serves to empty register Y into the computer. When register X has been filled by input pulses, this fact is again signalled by arrival of a sentinel pulse, this time on line 78, thereby causing flip-flop 70 to revert to its "*a*" output producing condition; and as a result, line 79 is energized whereby a signal passes via gate 69 to a pulse former **52*a*. The leading edge of the pulse from flip-flop 70 is shaped by pulse former 52*a* and applied through buffer 53** to the "*b*" input side of flip-flop 54 thereby to return input control to the Y register.

The alternating procedure thus described will continue for successive words of information until a full block of information has been received. Upon termination of such a block of information, the "720" count from counter 42 resets flip-flop 37 (Figure 2) to its "*b*" output condition whereby the signal on line 38 disappears; and as a result of this further operation, gates 66 and 69 (Figure 4) both close. When the last register becomes full, for example register X, the signal on line 78 will shift flip-flop 70 to its "*a*" output condition, as has been described, but flip-flop 54 will not be shifted to its "*b*" output condition due to the fact that gate 69 is now closed. The same condition would, of course, exist for a terminating signal on line 65 to flip-flop 54. Thus, when a complete block of information has been read, both flip-flops 54 and 70 remain in their "*a*" output conditions whereby neither of transformer windings 55 nor 71 are operated; and the transistors 57, 58, 74 and 75 are all de-energized whereby no further sprocketing or information signals may flow to either register X or register Y.

Figure 5A:
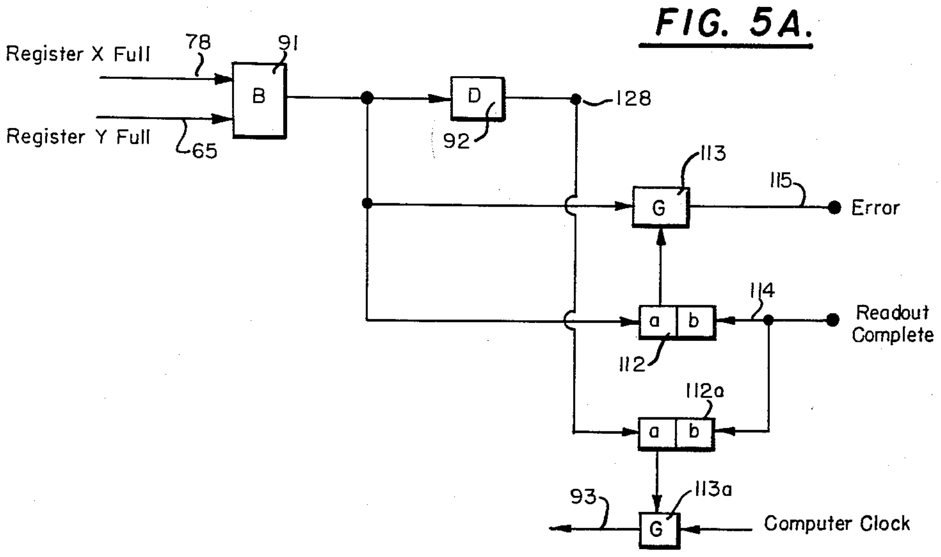
Figures 5A and 5B illustrate an improved register read-out system such as may be employed with the arrangements of Figures 2 and 4.
Figure 5B:
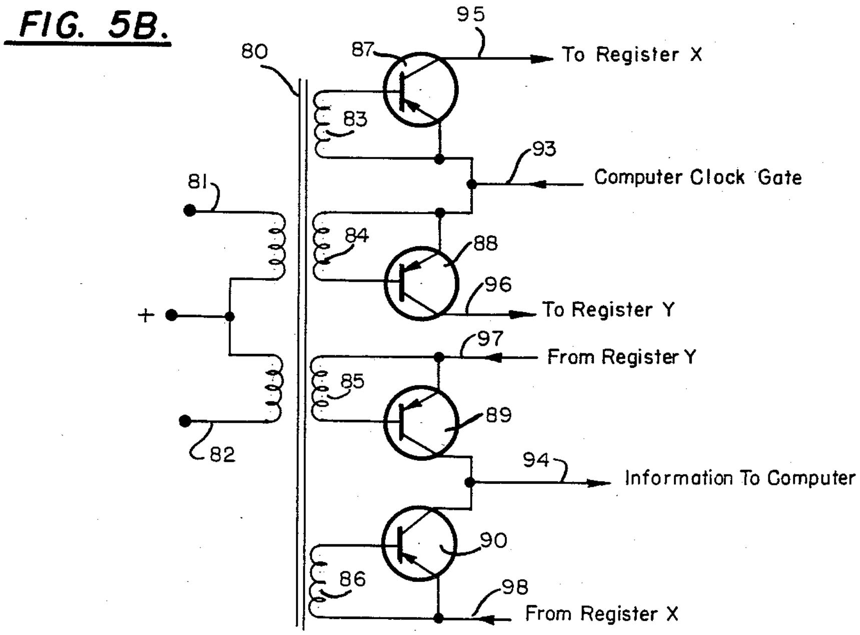

It will be appreciated from the foregoing description that as information is alternately stored in the registers X and Y, further synchronizing means are also provided for unloading in alternate sequence the said registers X and Y to a computer or ultimate utilization circuit. Such an output synchronization switch is illustrated in Figures 5A and 5B. In particular, it will be noted that an output switching transformer having input windings 81 and 82 may be employed. The same signals which are applied to windings 55 and 71 of transformer 56 (Figure 4) can also be coupled to windings 81 and 82 and thence to transformer output windings 83 through 86, thereby to correspondingly operate output transistors 87, 88, 89 and 90 which are coupled, as indicated in Figure 5B, to registers X and Y. It is, of course, possible to have windings 83 through 86 disposed on the same transformer 56 which is operating the input control to the registers X and Y whereby a single transformer may be associated with both the input and output of the registers X and Y.

In the operation of Figure 5B, winding 81 for example, may be energized when the Y register is being filled and the X register is full. During this time, transistors 87 and 90 are rendered conductive and the X register is read-out, as will later be described. Likewise, when the Y register is full and the X register is being filled, transistors 88 and 89 are rendered conductive. During this time, the Y register is read-out, as will be described.

As has been described in reference to Figure 4, each time that registers X or Y become full, a signal appears on either line 78 or 65. These signals, in addition to being coupled to the aforementioned flip-flops 54 and 70, can also be coupled via a buffer 91 (Figure 5A), and a delay means 92, to signal the computer clock gate **113*a* via terminal 128 and flip-flop 112*a* that read-out may now take place. The delayed signal sets flip-flop 112*a*** to its "*a*" state whereby gate **113*a* is rendered operative to pass the computer clock signals to the terminal 93 of the output switch shown in Figure 5B. The computer clock signals appearing at terminal 93 (Figure 5B) pass, via transistors 87 or 88, whichever is conductive, to terminals 95 or 96** thereby to step registers X or Y (whichever may be full) to read-out the information therefrom.

Read-out information from the selected register will thereafter pass via lines 97 or 98 and thence via transistors 89 or 90 which have been rendered conductive by potentials on windings 85 and 86 of transformer 80, to the common output line 94, so that information is read from one or the other of registers X and Y via line 94 to the computer or other utilization circuit associated with the overall system.

Delay means 92 (Figure 5A) should impose a sufficient time delay to permit switching of the transistors 57, 58 and 74, 75 as well as of the control flip-flops 54 and 70 (Figure 4) to take place before the read-out signals are sent via line 94 to the computer or utilization device. In the event that the computer for logical or speed reasons is unable to empty the first register by the time the second register has become filled, this fact can be detected by the flip-flop 112 (Figure 5A). In operation, it will be observed that the filling of either register X or register Y effects a pulse via buffer 91, thereby causing flip-flop 112 to move to its "*a*" output condition to open a gate 113. When the filled register has thereafter been emptied, a reset signal indicating that read-out is complete, is sent along line 114 to return flip-flops 112 and **112*a*** to their "*b*" output condition. Should the other register somehow become filled before reset occurs, the register-full-signal, which passes through buffer 91, will also pass through the now opened gate 113 to an error line 115. Appearance of an error signal on line 115 accordingly indicates that the input circuit will be trying to load information into full registers. It will be appreciated, of course, that errors of the types described will not normally occur. While it is obvious that, to avoid such errors, the computer circuit must be able to unload a full register more rapidly than the information source can fill the other register, typical computer circuits do ordinarily operate at speeds considerably in excess of those utilized in the input circuit; and therefore the error check, described in reference to Figure 5A, may be considered to represent a refinement which comes into operation upon rare occasions only.

The entire preceding discussion has, of course, been concerned with the recording, sensing, sampling, storage and read-out of information from a single channel on tape 10. A further consideration obtains, however, when plural channel recording and reproduction is undertaken; and attention is particularly invited to Figure 6 which illustrates a register system, such as may be employed in a plural channel recording device. For such plural channel recording applications, a plurality of input lines 1, 2, . . . n, serve respectively to deliver sensed signals to storage elements 116, 117 and 118, and each of these storage elements corresponds respectively to the structures already described in reference to Figures 4 and 5, together with their corresponding shifting registers. Each of the storage elements 116, 117 and 118 has a corresponding ready output line 128*a*, 128*b* and 128*c*, and these ready lines are in turn coupled respectively to the "*a*" input sides of flip-flops 121, 120 and 119. When each storage element 116, 117 and 118 has one register full, outputs appear on the corresponding lines 128*a*, 128*b* and 128*c*, whereby the said flip-flops 119 through 121 are shifted to their "*a*" output conditions. When all of the plurality of storage elements 116, 117 and 118 are therefore ready to give outputs, such coincidence may be detected by a conicidence gate 123 which energizes a line 124 to signal the computer that parallel read-out from the several registers may now take place. Each storage element 116, 117, 118, etc. then operates concurrently from the computer clock, in the manner already described in reference to Figure 5, to give forth both synchronously and in parallel, signals on the plural output lines 125, 126 and 127.

The operation thus described in reference to Figure 6 is desirable in plural channel recording and reproducing systems inasmuch as signals may in fact arrive on input lines 1, 2, . . . *n*, which are unsynchronized in time, due for instance to mechanical skew in the system; and the registers in the storage elements 116, 117 and 118 may therefore become full at different times. By utilizing the system already described in reference to Figure 6, therefore, such unsynchronized signals become resynchronized and read-out of full registers takes place only when all channel registers are full. When the computer has read-out one word of information, thus emptying one of the registers in each of the storage elements 116, 117 and 118, the computer may supply a signal to reset line 122 thereby to reset flip-flops 121, 120 and 119 to their "*b*" output conditions. It will be appreciated, of course, that this same reset signal appearing on line 122 can also be applied to the flip-flops 112 (Figure 5A) in each of the storage elements 116, 117, 118, etc.

While we have thus described preferred embodiments of the present invention, many variations will be suggested to those skilled in the art, and certain such variations have in fact already been discussed. It must therefore be stressed that the foregoing description is meant to be illustrative only and should not be considered limitative of our invention; and all such modifications and variations as are in accord with the principles described are meant to fall within the scope of the appended claims.

Having thus described our invention, we claim:

1. In combination, a record medium having a train of phase modulated signals thereon, transducer means for reading said phase modulated signals in sequence, control means coupled to the output of said transducer means for generating a train of spaced sprocket pulses in response to reading of said phase modulated signals, said control means including a binary counter for controlling the repetition rate of said sprocket pulses, gating means coupled to both said control means and to said transducer means for sampling signals appearing at the said output of said transducer means during occurrence of each of said sprocket pulses, and means responsive to the polarity of signals appearing at the output of said gating means for controlling the operation of said binary counter thereby to control the phase of said sprocket pulses.

2. In combination, a record medium having a plurality of phase modulated information signals arranged in spaced blocks, said spaced blocks being separated from one another by blocks of phase modulated control signals, transducer means for reading said control and information blocks in sequence, means coupled to the output of said transducer means for differentiating said transducer output during the reading of said control signals, oscillator means responsive to said differentiated signals for generating a train of sprocket pulses, and gating means responsive to said sprocket pulses for substantially regularly sampling the output of said transducer means during reading of said information blocks.

3. In an information system, a record medium having information pulses spaced thereon, said information pulses being separated by control pulses, transducer means adjacent said record medium for producing in sequence output control and information signals representative respectively of said recorded control and information pulses, flywheel oscillator means, means responsive to occurrence of said control pulses for synchronizing said flywheel oscillator means, a binary counter coupled to the output of said flywheel oscillator means for halving the output repetition rate of said oscillator means, whereby a train of spaced sprocket pulses appears at the output of said binary counter, means responsive to said output control signal from said transducer for adjusting the output phase of said binary counter, and means coupled to the output of said transducer means and responsive to said sprocket pulses for sampling said output information signal during spaced substantially regularly occurring time intervals.

4. In an information system, a magnetic tape having a plurality of spaced pulses recorded thereon, a magnetic transducer adjacent said tape for producing spaced output signals representative of said spaced recorded pulses, flywheel oscillator means coupled to the output of said transducer for producing a train of spaced substantially regularly occurring sprocket pulses having a repetition rate controlled by the repetition rate of said spaced output signals, gating means, and means for coupling both said output signals and said sprocket pulses to said gating means thereby to sample each of said output signals during occurrence of each of said sprocket pulses.

5. In combination, a magnetic tape having blocks of recorded information signals separated respectively by blocks of recorded control signals, said blocks of information and control signals being in turn separated by a recorded sentinel signal, transducer means for reading said control, sentinel, and information signals in sequence, a utilization circuit coupled to the output of said transducer means, sprocket pulse generating means coupled to the output of said transducer means and operable in response to the reading of said control signals to generate a train of spaced sprocket pulses, means for preventing transfer of signals from said transducer means to said utilization circuit during reading of said control signals, said last-named means including means responsive to reading of said sentinel signal for permitting transfer of signals from said transducer means to said utilization circuit, and means responsive to said sprocket pulses for sampling the output of said transducer means during subsequent reading of said information signals, whereby only said sampled information signals are transferred to said utilization circuit.

6. In an information system, a magnetic tape having blocks of plural magnetic pulses recorded thereon, transducer means adjacent said tape, means for effecting relative motion between said transducer means and said tape thereby to effect signals at the output of said transducer means, a utilization circuit, circuit means coupled to said transducer means and responsive to said transducer output signals for generating a train of spaced substantially regularly occurring sprocket pulses having a controlled repetition rate, gating means coupled to said transducer means and said circuit means and responsive to said sprocket pulses for sampling said transducer output and for transferring said sampled signals to said utilization circuit, and counter means coupled to said gating means and responsive to a predetermined number of said sampled signals comprising one of said blocks for halting said means for effecting relative motion between said transducer means and said tape.

7. In an information system, a record medium having information pulses spaced thereon, said information pulses comprising pulses of a first phase representative of a first binary digit and pulses of a second phase representative of a second binary digit, said information pulses being arranged in blocks of information separated by control pulses disposed in control blocks intermediate said information blocks respectively, said control blocks comprising sentinel pulses of one of said phases disposed adjacent the beginning and end of each control block and a plurality of pulses of the other of said phases spaced between said sentinel pulses, transducer means adjacent the record medium for producing in sequence a train of spaced output control signals followed by a train of information signals representative respectively of said recorded control and information pulses, oscillator means, synchronizing means coupling said transducer means and said oscillator means and responsive to said train of output control signals for synchronizing said oscillator means thereby to generate a train of spaced sprocket pulses having a repetition rate determined by the repetition rate of said spaced control pulses, and means coupled to the output of said transducer means and responsive to said sprocket pulses for sampling said output information signal during spaced substantially regularly occurring time intervals.

8. The combination of claim 7 including a binary counter coupled to the output of said oscillator means for halving the output repetition rate of said oscillator means, whereby said train of sprocket pulses appears at the output of said binary counter, and means for comparing said output control signal from said transducer with an output sprocket pulse from said binary counter thereby to determine the output phase of said binary counter.

9. In combination, a record medium having a train of phase modulated signals thereon, transducer means for reading said phase modulated signals in sequence, first control means including an oscillator and means repsonsive to signals at the output of the transducer for synchronizing said oscillator, said first control means being coupled to the output of said transducer means for generating a train of spaced sprocket pulses in response to reading of said phase modulated signals, and second control means coupled to the output of said transducer means for sampling signals at the said output of said transducer means during occurrence of each of said sprocket pulses.

10. The combination of claim 9 wherein said second control means includes a gate circuit, said gate circuit being opened to signals at the output of said transducer means by each of said sprocket pulses.

11. The combination of claim 10 wherein said record medium comprises a magnetic tape, said transducer means comprising a magnetic transducer.

12. In an information system, a magnetic tape having a plurality of phase modulated pulses recorded thereon, pulses of a first phase being representative of first binary digits and pulses of a second phase being representative of second binary digits, a magnetic transducer adjacent said tape for producing an output signal representative of said recorded pulses, oscillator means coupled to the output of said transducer for producing a train of spaced substantally regularly occurring sprocket pulses in response to occurrence of said output signal, gating means, and means for coupling both said output signal and said sprocket pulses to said gating means thereby to sample said output signal during occurrence of each of said sprocket pulses.

13. The combination of claim 12 including a control channel comprising a series connected differentiator and rectifier, the input of said control channel being coupled to the output of said transducer, and means coupling the output of said control channel to said oscillator means thereby to synchronize the output of said oscillator means.

14. The combination of claim 13 including a binary counter coupled to the output of said oscillator, and means responsive to selected ones of said recorded pulses for determining the output phase of said binary counter, whereby said sprocket pulses appear at the output of said binary counter.

15. The combination of claim 12 wherein said phase modulated signals are arranged in spaced information blocks each of which blocks comprises a predetermined number of binary digits, and counter means operable during the reading of said information blocks by said magnetic transducer for signalling completion of the reading of each such information block.

References Cited in the file of this patent

UNITED STATES PATENTS

| | | |
|---|---|---|
| 2,540,654 | Cohen | Feb. 6, 1951 |
| 2,611,813 | Sharpless et al. | Sept. 23, 1952 |
| 2,700,155 | Clayden | Jan. 18, 1955 |
| 2,702,315 | Roderick | Feb. 15, 1955 |
| 2,718,356 | Burrell et al. | Sept. 20, 1955 |
| 2,721,990 | McNaney | Oct. 25, 1955 |
| 2,782,398 | West | Feb. 19, 1957 |